United States Patent [19]

Kyoto et al.

[11] Patent Number: 5,364,428
[45] Date of Patent: Nov. 15, 1994

[54] METHOD FOR PRODUCING GLASS PREFORM FOR OPTICAL FIBER

[75] Inventors: Michihisa Kyoto; Yoichi Ishiguro; Akira Urano; Hideo Kakuzen, all of Yokohama, Japan

[73] Assignee: Sumitomo Electric Industries, Ltd., Osaka, Japan

[21] Appl. No.: 203,750

[22] Filed: Mar. 1, 1994

Related U.S. Application Data

[60] Continuation of Ser. No. 937,731, Nov. 2, 1992, abandoned, which is a division of Ser. No. 832,330, Feb. 7, 1992, Pat. No. 5,203,899, which is a division of Ser. No. 640,556, Jan. 14, 1991, Pat. No. 5,145,507, which is a continuation of Ser. No. 221,432, Jul. 19, 1988, abandoned, which is a continuation-in-part of Ser. No. 839,336, Mar. 13, 1986, abandoned.

[30] Foreign Application Priority Data

Mar. 18, 1985 [JP] Japan .................. 60-52180
Oct. 3, 1985 [JP] Japan .................. 60-219090

[51] Int. Cl.$^5$ ........................... C03B 37/023
[52] U.S. Cl. ........................... 65/397; 65/DIG. 16; 65/900; 65/17.4; 65/416
[58] Field of Search ............ 65/3.11, 3.12, 18.2, 65/DIG. 16, 112, 900

[56] References Cited

U.S. PATENT DOCUMENTS

| | | | |
|---|---|---|---|
| 3,868,170 | 2/1975 | DeLuca | 65/3.12 |
| 4,125,388 | 11/1978 | Powers | 65/3.12 |
| 4,165,915 | 8/1979 | Rav | 65/3.12 |
| 4,292,063 | 9/1981 | Abe | 15/DIG. 16 |
| 4,586,943 | 5/1986 | Kyoto | 65/DIG. 16 |
| 4,629,485 | 12/1986 | Berkey | 65/3.12 |
| 4,832,720 | 5/1989 | Watanabe et al. | 65/4.3 |
| 4,846,867 | 7/1989 | Yokoto et al. | 65/DIG. 16 |

FOREIGN PATENT DOCUMENTS

| | | |
|---|---|---|
| 01450651 | 5/1985 | European Pat. Off. . |
| 195407 | 9/1986 | European Pat. Off. . |
| 2833051 | 2/1979 | Germany . |
| 55-67533 | 5/1980 | Japan . |
| 62-216934 | 9/1987 | Japan . |
| 62-230533 | 9/1988 | Japan . |
| 2023130 | 12/1979 | United Kingdom . |

*Primary Examiner*—Robert L. Lindsay
*Attorney, Agent, or Firm*—Cushman, Darby & Cushman

[57] ABSTRACT

A glass preform which is used for fabricating an optical fiber, has substantially no bubbles therein and contains sufficient amount of fluorine is produced by a method comprising steps of: forming a porous glass soot body from a glass-forming raw material, removing trapped gas and water from pores of the soot body by heating the soot body under pressure lower than several ten Torr. at a temperature at which the soot body is not vitrified, filling the pores of the soot body with a gas containing SiF$_4$ and uniformly adding fluorine to the soot body, vitrifying the fluorine-added soot body into a transparent glass body, boring said transparent glass body to form a bore therein, and inserting a highly pure quartz rod in said bore to form a glass preform, or a method forming a glass soot composite body having a core portion consisting of a solid glass and a peripheral portion consisting of a porous glass mass, removing trapped gas and water from pores of the soot composite body by heating the soot composite body under a pressure lower than several ten Torr. at a temperature at which the porous glass mass is not vitrified, filling the pores in the porous glass mass of the soot composite body with a gas containing SiF$_4$ and uniformly adding fluorine to the soot glass mass, and vitrifying the fluorine-added soot glass mass into a transparent glass mass to form a glass preform.

3 Claims, 3 Drawing Sheets

METHOD FOR PRODUCING GLASS PREFORM FOR OPTICAL FIBER

This is a continuation of application Ser. No. 07/937,731, filed on Nov. 2, 1992, which was abandoned upon the filing hereof; which is a division of 07/832,330 filed Feb. 7, 1992 (U.S. Pat. No. 5,203,899); which is a division of 07/640,556 filed Jan. 14, 1991 (U.S. Pat. No. 5,145,507); which is a continuation of 07/221,432 filed Jul. 19, 1988 (now abandoned); which is a continuation-in-part of 06/839,336 filed Mar. 13, 1986 (now abandoned).

BACKGROUND OF THE INVENTION

1. Field of the Invention

The present invention relates to a method for producing a glass preform for use in the fabrication of an optical fiber. More particularly, it relates to a method for producing a glass preform for use in the fabrication of an optical fiber which contains fluorine.

2. Description of Related Art

A glass preform for use in the fabrication of an optical fiber is produced by various methods. Among them, the VAD method and OVPD method are attractive methods since the productivity and quality of the optical fiber fabricated are better than other methods. These methods comprise synthesizing glass soot particles by flame hydrolysis of a glass-forming raw material and depositing the soot particles on a rotating seed material to form a porous soot preform. Then, the porous soot preform is heated in a suitable atmosphere to dehydrate and vitrify it so as to produce a transparent glass preform, which is drawn to fabricate an optical fiber.

The optical fiber comprises a core through which light is propagated and a cladding which surrounds the core and reflects light to be propagated. The numerical aperture (hereinafter referred to as "N.A.") is calculated from the average refractive indexes $n_i$ and $n_2$ of the core and the cladding as follows:

$$N.A. = \sqrt{n_1^2 - n_2^2} \quad (n_1 > n_2).$$

it is understood that the difference of the refractive index between the core and the cladding is increased to obtain large N.A. and one of following measures is taken in case of a silica ($SiO_2$) glass type optical fiber:

1) In the core, an additive for increasing its refractive index is added.

2) In the cladding, an additive for lowering its refractive index is added.

3) A combination of the measures 1 and 2. Needless to say, the cladding in case 1 and the core in case 2 are made of silica glass.

Usually, $GeO_2$, $P_2O_5$, $Al_2O_3$ and $TiO_2$ are used to increase the refractive index of silica glass, and $B_2O_3$ and fluorine are used to lower the refractive index of silica glass. FIG. 1 shows the variation of the refractive index of silica glass added with the various additives for light with a wavelength of 0.59 μm (cf. Kumamaru and Kurosaki, "Light Transmission Materials" in the Industrial Materials (Kogyozairyo), 27 (1979) 39).

Among the additives, recently, the use of fluorine is the most attractive and it has been studied as an additive in the VAD method and the like.

To achieve the same difference of refractive index between the core and the cladding of the optical fiber, measure 2 or 3 is preferred since the additives are not added to the core, or only a smaller amount of the additive is added to the core than in the measure 1. This is advantageous for a high N.A. optical fiber since the attenuation of light transmission due to the presence of the additive is decreased. In addition, an optical fiber exhibiting good performance in the presence of radiation can only be produced by the measure 2. Therefore, it is greatly advantageous to add the additive to the cladding to lower its refractive index.

In the VAD method, fluorine is added in a sintering step, namely a vitrifying step of the soot preform. This has following advantages:

1. Fluorine is homogeneously added to achieve uniform distribution of the refractive index, and 2. An addition rate of fluorine is high. Namely, Several to ten hundreds grams of the porous soot preform can be treated and vitrified within several hours.

In the conventional methods, the soot preform is heated under a total pressure of one atmospheric pressure of an atmosphere of a gaseous fluorine-containing compound which is optionally diluted with an inert gas to add fluorine to the preform. However, according to the conventional method, undesirable bubbles tend to remain in the glass preform. Particularly in the VAD method, when fluorine is to be added in an amount corresponding to −0.5% of the refractive index difference, the bubbles remain in the glass. The amount of the bubbles increases as the added amount of fluorine increases.

Further, when the inert gas is used to dilute the fluorine-containing compound, any inert gas except helium, for example, nitrogen, argon or oxygen always forms bubbles in the glass preform. Helium sometimes forms bubbles in the glass preform. Although helium is a preferable diluting gas, it is expensive and increases the production cost of the optical fiber.

The reason why the bubbles are formed in the glass preform may be as follows:

When the soot preform is heated in the atmosphere comprising the fluorine-containing compound under a total pressure of one atmospheric pressure, gas trapped by the glass soot particles can not be removed and forms bubbles in the vitrified preform.

In case where the soot preform is heated in the inert gas such as nitrogen before fluorine is added, the inert gas may contained in pores in the soot particles. Therefore, if the soot preform is heated under the total pressure of atmospheric pressure, the inert gas cannot be dissipated from the surface of the soot preform so that a gaseous mixture of the inert gas and the fluorine-containing compound is present in the soot preform. Thus, the concentration of the fluorine-containing compound in the soot preform is lower than that in the atmosphere, particularly when a bulk density of the soot preform is 0.4 $g/cm^3$ or larger. As the result, fluorine may not be added to the glass in a desired amount, or it may take longer to add a sufficient amount of fluorine to the glass.

The fluorine-containing compound penetrates in the soot preform through minute spaces in it and then the inert gas is exhausted from the preform. Therefore, replacement of the gas in the preform takes a much longer time.

SUMMARY OF THE INVENTION

One object of the present invention is to provide a method for producing a glass preform having fewer or no bubbles therein increasing the amount of fluorine to be added to the glass preform.

Another object of the present invention is to provide a method for producing a glass preform from a soot preform at a high production rate.

A further object of the present invention is to provide a method for economically producing a glass preform.

According to one aspect of the present invention there is provided a method for producing a glass preform for use in fabrication of an optical fiber, which comprises steps of:

forming a porous glass soot body from a glass-forming raw material, removing trapped gas and water from pores of the soot body by heating the soot body under under pressure lower than-several ten Torr. at a temperature at which the soot body is not vitrified, filling the pores in the soot body with a gas containing $SiF_4$ and uniformly adding fluorine to the soot body preferably with keeping a total pressure between $10^{-2}$ to 1 atm., vitrifying the fluorine-added soot body into a transparent glass body, boring said transparent glass body to form a bore therein and inserting a highly pure quartz rod in said bore to form a glass preform.

According to another aspect of the present invention, there is provided a method for producing a glass preform for use in fabrication of an optical fiber, which comprises steps of:

forming a glass soot composite body having a core portion consisting of a solid glass and a peripheral portion consisting of a porous glass mass, removing trapped gas and water from pores of the porous glass mass by heating the soot composite body under a pressure lower than several ten Torr. at a temperature at which the porous glass mass is not vitrified, filling the pores in the soot composite body with a gas containing $SiF_4$ and uniformly adding fluorine to the porous glass mass of the soot composite body, and vitrifying the fluorine-added soot glass mass into a transparent glass mass to form a glass preform.

DETAILED DESCRIPTION OF THE INVENTION

In the method of the present invention, the porous soot body or the porous glass mass of the soot composite body may be produced by any one of conventional methods such as the sol-gel method, the VAD method, the CVD method and the like.

In the step for removing the gas and water from the pores, a degree of the reduced pressure is usually from several ten Torr. (e.g. about 60 Torr.) to $10^{-3}$ Torr.

A reaction between the quartz glass and $SiF_4$ may proceed as follows:

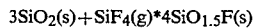
$3SiO_2(s)+SiF_4(g) \rightarrow 4SiO_{1.5}F(s)$ wherein (s) and (g) stand for solid and gaseous states, respectively. Accordingly, $CO_2$ and CO are not formed. When $SF_6$ or $CF_4$ is used, $SO_3$ or $CO_2$ may be generated according to the following reaction formulas and form bubbles:

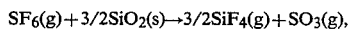
$SF_6(g)+3/2SiO_2(s) \rightarrow 3/2SiF_4(g)+SO_3(g)$, or

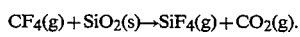
$CF_4(g)+SiO_2(s) \rightarrow SiF_4(g)+CO_2(g)$.

Therefore, no fluorine-containing compound having sulfur and/or carbon atoms is preferred.

$SiF_4$ may be diluted with a diluent gas such as helium, argon and nitrogen.

The method according to the present invention is particularly advantageous for the soot body or the soot glass mass having a bulk density of not less than 0.4 g/cm³. As the bulk density of the soot body or mass increases, it becomes more difficult for the gaseous compound to penetrate in the pores in the soot body or mass or to replace the trapped gas therewith.

Figure 1:
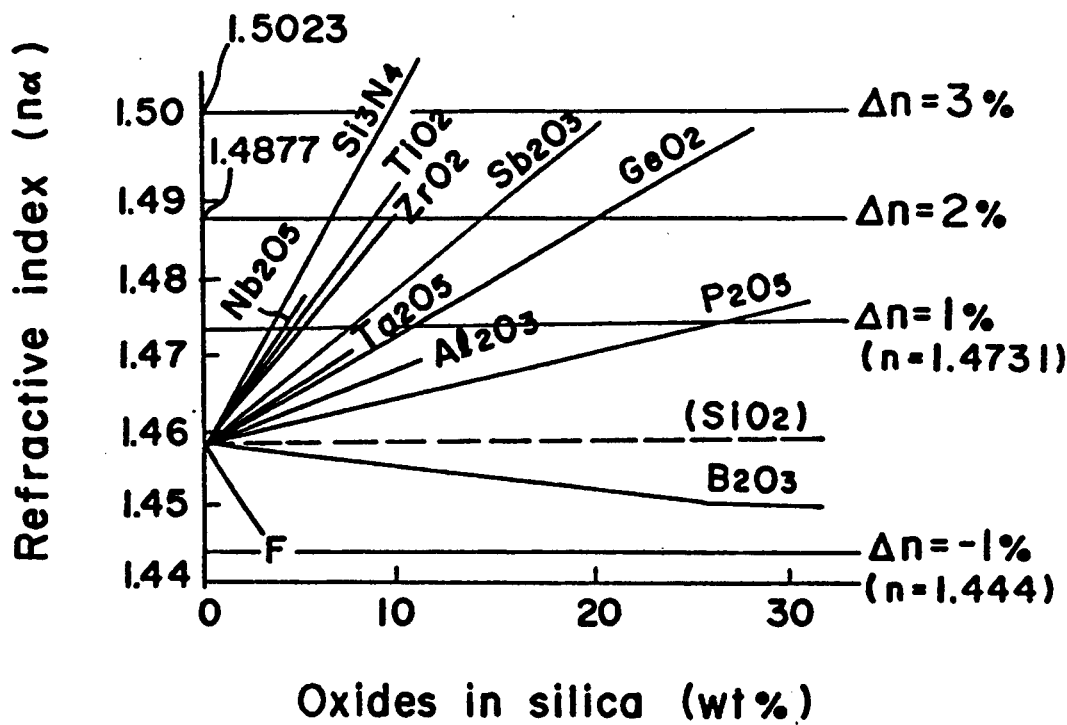
FIG. 1 shows the variation of the refractive index of silica glass added with the various additives for light with a wavelength of 0.59 μm.
Figure 2:
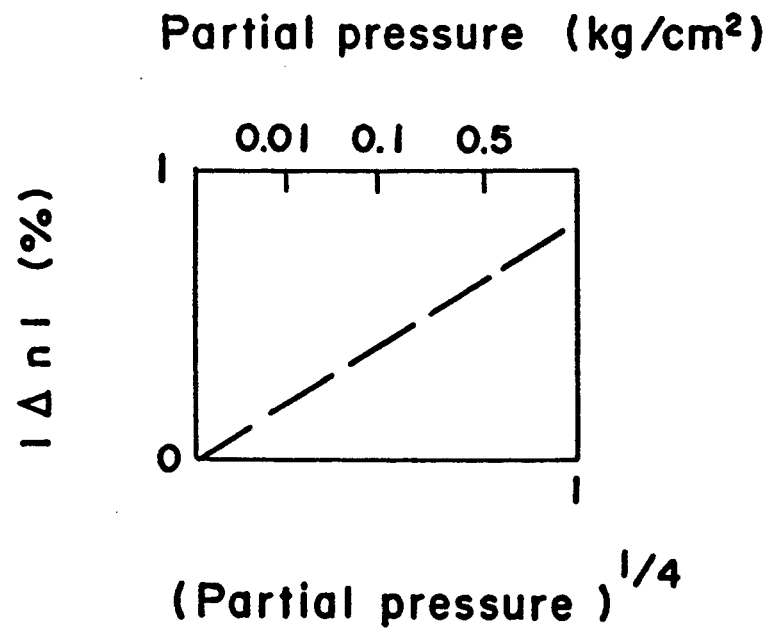
FIG. 2 shows the relationship between specific difference of refractive index (Δn) and the partial pressure of $SiF_4$.

In one of the preferred embodiments of the present invention, a partial pressure of $SiF_4$ is controlled according to the equation:

(Specific difference of refractive index,
$\Delta n) = 0.75 \times$ (partial pressure of $SiF_4)^{\frac{1}{4}}$ preferably in a range from 0.01 to 0.5 atm. This relationship can be graphed as shown in FIG. 2. In addition, when fresh $SiF_4$ is continuously added, the partial pressure can be controlled and impurities from the heating equipment are removed from the reaction area. Further, the reaction rate can be kept high by the introduction of fresh $SiF_4$. The reason for this may be assumed that a dissociation reaction according to the following reaction formula could be suppressed:

$SiF_4(g) \rightarrow SiF_2(g)+F_2(g)$.

As understood from FIG. 2, as the temperature is raised and the partial pressure of $SiF_4$ is increased, the difference of the refractive index is increased. Practically, when the partial pressure of $SiF_4$ is higher than 0.5 atm. or the temperature exceeds 1,400° C., the bubbles tend to form in the glass preform. The formation of bubbles is more seriously affected by the high partial pressure of $SiF_4$ than the high temperature.

Thus, the partial pressure of $SiF_4$ is preferably from 0.01 to 0.5 atm. The temperature is preferably not lower than 800° C. At a lower temperature, the reaction does not effectively proceeds.

In a preferred embodiment, the soot preform is preferably dehydrated before the addition of fluorine, since fluorine is more effectively added to the dehydrated soot body or porous glass mass.

The above described ranges of various reaction conditions are preferred ranges. The method according to the present invention may be carried out outside the above preferred ranges more advantageously than the conventional methods.

The first embodiment of the invention will be illustrated, by way of example, with reference to the accompanying drawings.

Figure 3:
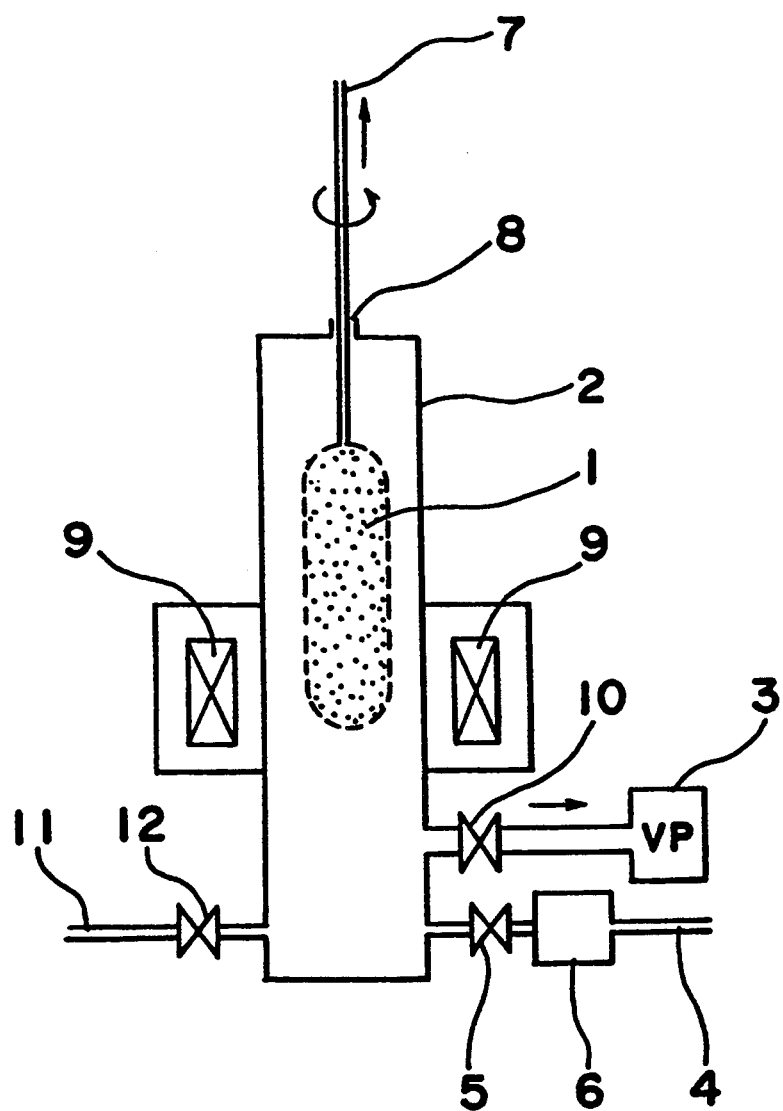
FIG. 3 shows one embodiment of an apparatus for carrying out the method of the invention.

FIG. 3 shows one embodiment of an apparatus for carrying out the method of the invention. In FIG. 3, a soot preform 1 may be produced by a sol-gel method or a flame hydrolysis method such as the VAD or CVD method and is placed in a furnace 2 such as a sintering furnace. The furnace 2 is evacuated by a ventilating pump 3 connected to the furnace 2 through a valve 10. The fluorine-containing compound is introduced from an inlet 4 through a valve 5 by means of a compressor 6. The soot preform is attached at a lower end of a rod 7 made of, for example, glass or carbon, which can move up and down with rotation. A hole through which the rod is inserted in the furnace is sealed with a sealing member 8, which is resistant to pressure, reduced pressure and heat. The furnace 2 is heated with a heater 9 which generates heat by electric resistance heating or high frequency heating. Other gases such as nitrogen, chlorine, argon and helium may be introduced from an inlet 11 through a valve 12.

Firstly, the furnace 2 is filled with nitrogen gas and the soot preform 1 is inserted therein as shown in FIG. 3. Then, the helium gas is evacuated to gradually reduce the interior pressure of the furnace 2. In this step, care should be taken so that the preform 1 is not present near the ventilation hole connected to the ventilating pump 3. Quick ventilation is not preferred since pressure difference is generated between the inside and periphery of the soot preform and deforms the preform.

Under the reduced pressure, the soot preform 1 is heated by means of the heater 9. Thereby, the gas and water contained in the spaces of the soot preform are removed. In this step, the temperature is not so high as to vitrify the soot preform. Preferably, the temperature is not higher than 850° C., particularly from a room temperature to 700° C. According to the experiments by the inventors, even at a temperature of 70° to 80° C., the objects of the invention could be achieved.

The pressure is preferably from several ten Torr to $10^{-3}$ Torr. The lower the pressure, the better.

The trapped gas and/or water can be more effectively removed by carefully introducing a gas such as chlorine, helium or argon to slightly increase the pressure and again lowering the pressure.

After removal of the trapped gas and/or water is completed, the fluorine-containing gas is introduced in the furnace 2 at a low flow rate from the inlet 4 through the valve 5 with controlling its flow rate. The introduction of the fluorine-containing compound at a high flow rate undesirably generates the pressure difference between the inside and periphery of the soot preform 1. At the beginning of the introduction of the fluorine-containing compound, the pressure in the furnace 2 is from several ten Torr to $10^{-3}$ Torr. However, at the final stage of the addition of fluorine, the fluorine-containing gas may be introduced at a higher flow rate.

Now, the method is described with making reference to a case in which $SiF_4$ as the fluorine-containing compound is introduced at a pressure of $10^{-2}$ Torr at the beginning and at atmospheric pressure at the end.

In this case, a small pores $\Delta V$ in the soot preform is filled with $SiF_4$. Assuming that there is no gas except nitrogen and $SiF_4$ in the space $\Delta V$, at the end of the introduction of $SiF_4$, the partial pressure of nitrogen is $10^{-2}$ Torr and that of $SiF_4$ is $(760-10^{-2})$ Torr. Thus, the volume ratio of nitrogen to $SiF_4$ is calculated to be about 13 ppm according to the following equation:

$$\Delta V_0 N_2 / \Delta V_0 SiF_4 = 1/(760 \times 100) = 1.3 \times 10^{-5}.$$

On the contrary, if the pressure is not reduced and nitrogen gas trapped under a pressure slightly higher than atmospheric pressure is to be replaced with $SiF_4$ pressurized to several atm, it can be easily understood that the replacement of nitrogen with $SiF_4$ is much worse than the above case. Assuming that $SiF_4$ is introduced at a pressure of 5 atm. and there is no temperature difference before and after the introduction, when the originally trapped gas is not removed, nitrogen is compressed in the small pores $\Delta V$ from about 1 atm. to 5 atm. so as to balance the pressure of $SiF_4$. Therefore, the content of nitrogen gas in the mixed gas in the small space is calculated to be 20% as follows:

$$\Delta V N_2 / (\Delta V SiF_4 + \Delta V N_2) = 1/5 = 2 \times 10^{-1}.$$

This content of 20% is much larger than that in the above case of 13 ppm.

According to the present invention, the trapped gas is removed so that the fluorine-containing compound is not diluted with the trapped gas.

After replacing the trapped gas with $SiF_4$, the soot preform is heated to a temperature of 800° to 1,400° C. to activate the $SiO_2$ so as to promote the reaction of $SiO_2$ with $SiF_4$. The soot preform is then sintered by raising the temperature up to 1,400° C. with introducing an inert gas such as helium or argon to form a transparent glass preform.

Figure 4:
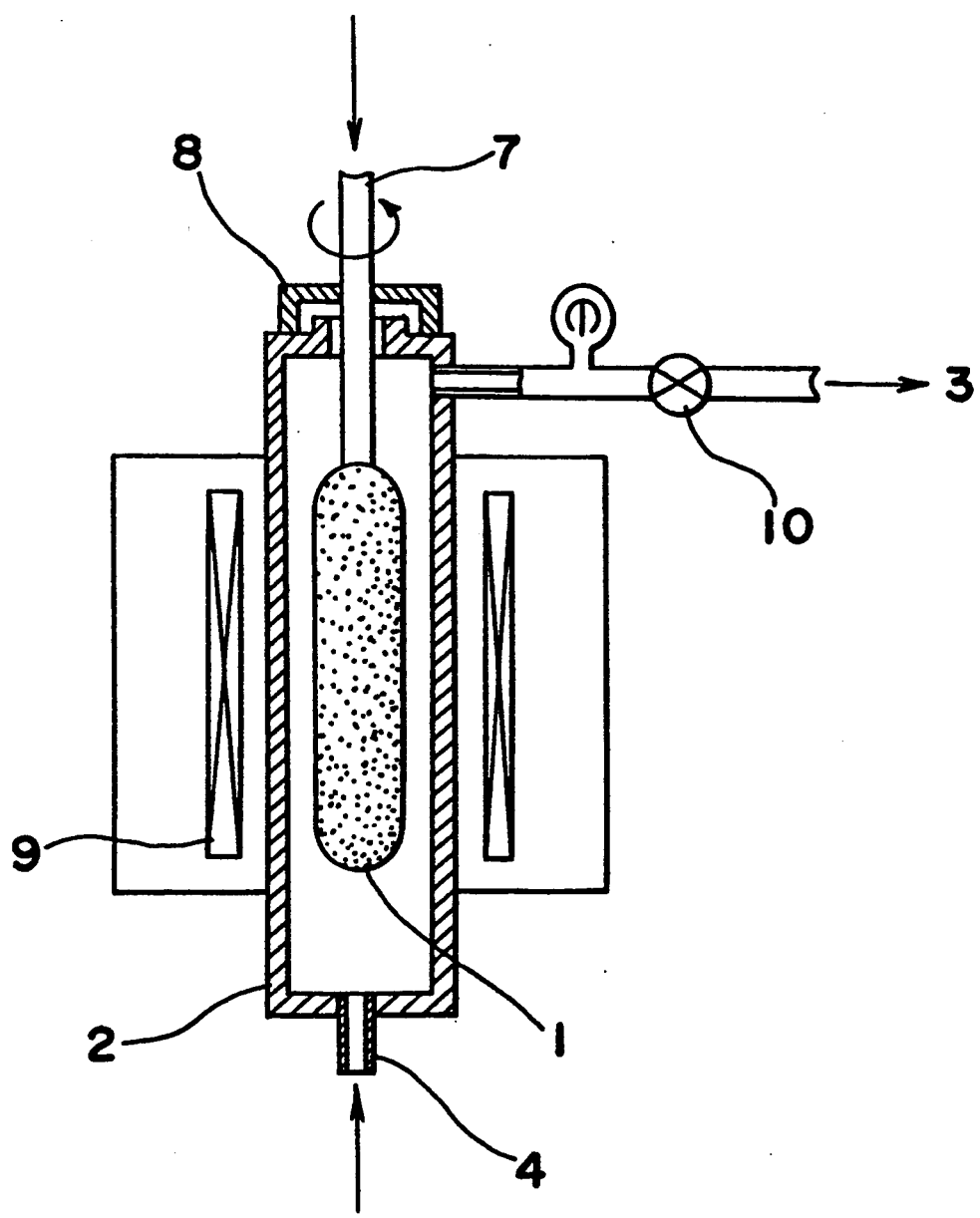
FIG. 4 shows another embodiment of an apparatus for carrying out the second embodiment of the method according to the present invention.

FIG. 4 shows an apparatus to be used for carrying out the second embodiment of the method according to the present invention. The same numerals stand for the same elements as in FIG. 3.

In the preferred embodiment of the second embodiment, the glass-forming raw material such as $SiCl_4$ is flame hydrolyzed according to a conventional method, for example, the VAD method to form $SiO_2$ glass soot particles and depositing them on a substrate to produce a glass soot preform. The soot preform consists of uniform glass particles having a particle size under a submicron order and has a bulk density of 0.2 to 0.5 g/cm$^3$. Therefore, the soot preform is sufficiently porous. The glass soot preform may contain $GeO_2$ and/or $P_2O_5$.

The glass soot preform is placed in the apparatus as shown in FIG. 4 and kept at a temperature of about 800° C. When placing the preform in the apparatus, the following care should be taken:

The pressure in the apparatus is reduced in an air tight condition, and the seal 8 should be tightly placed. The seal is preferably a carbon seal since it does not lose resiliency at a high temperature. Further, dust is prevented from adhering to the surface of the seal. When the sealing is insufficient, gas in the apparatus leaks, and moisture penetrates into the apparatus to contaminate the interior of the apparatus. Thereby, dehydration of the soot preform becomes insufficient or the fluorine-containing compound reacts with moisture to form hydrogen fluoride which etches the soot preform.

The soot preform placed in the apparatus is dehydrated at a temperature of 800° to 900° C. for 10 to 20 minutes. In this step, the atmosphere preferably comprises an inert gas such as nitrogen, argon and helium and its flow rate is preferably from 5 to 10 l/min. If the soot preform is heated to a temperature of 1,200° to 1,300° C. immediately after it is placed in the apparatus, it often breaks. Therefore, such preheating is suitable for preventing the soot preform being dehydrated from breaking. Then, the soot preform is heated to a temperature of 800° to 1,100° C. at a rate of 3° to 10° C./min. under pressure of 0.2 to 0.5 atm in an atmosphere of the inert gas containing 10 to 50% by mole of chlorine gas in order to completely dehydrate the soot preform. The time required to dehydrate the preform depends on its bulk density and it takes a longer time as the bulk density increases. For example, when the bulk density is 0.25 g/cm$^3$, one hour is sufficient to dehydrate the soot preform.

Then, to an atmosphere of the inert gas and chlorine gas, a gaseous fluorine-containing compound, preferably SiF$_4$ is added with a partial pressure of 0.05 to 0.5 atm. Thereafter, the supply of the inert gas and chlorine gas is terminated and the pure gaseous fluorine-containing compound is introduced in the apparatus at a flow rate of about 3 to 7 l/min., preferably about 5 l/min. The temperature is gradually raised to 1,400° to 1,600° C., preferably about 1,500° C., during which the preform is rotated at a rate of 10 to 20 rpm. The rotation of the soot preform facilitates homogeneous heating of the soot preform. If the soot preform is not homogeneously heated, fluorine is not uniformly added and/or the glass preform is deformed. By this way, the soot preform is vitrified and added with fluorine.

When the heating means 9 has a relatively short length, it is preheated to the above desired temperature, and then the soot preform is introduced into the furnace 2 by lowering it at a constant rate of 2 to 4 mm/min.

The furnace 2 is preferably made of carbon, alumina or mullite. The inner surface of the furnace may be laminated with quart glass. The heating means 9 can be made of carbon or silicon carbide.

Practical and presently preferred embodiments of the present invention are shown in the following examples.

EXAMPLE 1

The apparatus of FIG. 3 was used.

A pure silica soot body a core of which had a bulk density of 0.4 g/cm$^3$ was placed in the furnace 2 and heated to 850° C. with evacuating the furnace to 10$^{-3}$ Torr. Then, pure SiF$_4$ was introduced to 1 atm. and the body was heated to 1,400° C. or higher.

Δn of the fluorine-added glass body was about −1.0%.

By boring the glass body by a conventional method such as mechanical boring or chemical etching, a cylindrical tube was made.

A composite of the produced tube as a cladding material and a pure quartz rod as a core material was draw to fabricate an optical fiber having attenuation of light transmission of 2 dB/Km at a wavelength of 0.85 μm.

COMPARATIVE EXAMPLE 1

In the same manner as in Example 1 but not evacuating the soot body before the addition of fluorine, the glass body was produced. Δn of the fluorine-added glass body was −0.1% in the core portion and −1% at the peripheral portion.

EXAMPLE 2

Around the periphery of a rod made of quartz glass containing 17% by weight of GeO$_2$ and having a diameter of 10 mm, SiO$_2$ particles were deposited by flame hydrolysis of SiCl$_4$ in a thickness of 60 mm to produce a soot body.

The produced soot body was treated in the same manner as in Example 1 to obtain a transparent glass preform. Then, the glass preform was drawn to fabricate an optical fiber having attenuation of light transmission of 2 dB/Km at a wavelength of 0.85 μm.

EXAMPLE 3

A soot body was produced in the same manner as in Example 2 using a rod consisting of a core of pure quartz glass and a periphery of quartz glass added with 1% by weight of fluorine and having a diameter of 10 min.

The soot body was placed in the furnace 2 of FIG. 3 the inner wall of which was made of quartz, and heated to 1,000° C. under pressure of 50 Torr in an atmosphere of chlorine and helium in a volume ratio of 0.1 to 0.5 (Cl$_2$/He). Then, the pressure was reduced to 10$^{-2}$ Torr. to dehydrate the soot body. Thereafter, the soot body was gradually heated from 1,000° C. to 1,600° C. with introducing helium gas at a rate of 2 l/min. from the inlet 11 and SiF$_4$ at a rate of 60 ml/min. from the inlet 5 to vitrify the body.

The produced glass preform was transparent and had no bubble therein. Fluorine was uniformly added at a concentration of 1% by weight.

An optical fiber fabricated from the glass preform had attenuation of light transmission of 0.4 dB/Km at a wavelength of 1.30 μm.

EXAMPLE 4

The apparatus of FIG. 4 was used.

A pure quartz soot preform was heated at 1,200° C. for 2 hours in an atmosphere of pure SiF$_4$ under pressure of 0.2 atm. After terminating supply of SiF$_4$, the soot body was heated to 1,600° C. in an atmosphere of helium under pressure of 0.05 atm. to vitrify the body to form a glass body. Δn of the glass body was −0.5%.

From the produced glass body, a cylindrical tube was made by boring.

A composite of the tube and a rod of dehydrated pure silica was collapsed and drawn to fabricate an optical fiber having a core diameter of 5 μm and an outer diameter of 125 μm. The difference of the refractive index between the core and the cladding was 0.5%. The optical fiber had attenuation of light transmission of 0.2 dB/Km at a wavelength of 1.55 μm.

EXAMPLE 5

A pure quartz soot body produced by the VAD method was heated in the furnace of FIG. 4 at 900° C. to dehydrate it.

Then, the furnace was filled with pure SiF$_4$ at pressure of 0.05 atm. and heated from 800° C. to 1,600° C. at a heating rate of 3.5° C./min. to vitrify it. Δn of the vitrified glass body was −0.35%. The water content of the glass body was less than 0.1 ppm.

EXAMPLE 6

In the same manner as in Example 4 but changing the pressure of SiF$_4$ as shown in following Table 1, the glass body was produced. Δn of the produced glass body is also shown in Table 1.

TABLE 1

| Pressure (atm) | Δn (%) |
| --- | --- |
| 0.01 | −0.24 |
| 0.02 | −0.28 |
| 0.03 | −0.30 |
| 0.05 | −0.35 |
| 0.10 | −0.42 |
| 0.40 | −0.60 |
| 0.50 | −0.63 |
| 0.80 | −0.70*[1] |

Note: *[1] A few bubbles remained in the body.

EXAMPLE 7

In the same manner as in Example 5 but changing the pressure of $SiF_4$ as shown in following Table 2, ten glass preforms under each pressure were produced. Δn of the produced glass preform and the presence of bubbles are shown in Table 2.

TABLE 2

| Pressure (atm.) | Δn (%) | Number of glass preforms with bubbles |
| --- | --- | --- |
| 0.1 | −0.42 | None |
| 0.2 | −0.50 | None |
| 0.3 | −0.55 | None |
| 0.4 | −0.60 | None |
| 0.5 | −0.65 | None |
| 0.6 | −0.66 | 1–3 |
| 0.7 | −0.68 | 1–3 |
| 0.8 | −0.71 | 1–3 |
| 0.9 | −0.73 | 5 |
| 1.0 | −0.75 | Almost all |

COMPARATIVE EXAMPLE 2

In the same manner as in Example 5 but using a mixture of $SiF_4$ and helium under an atmospheric pressure in place of pure $SiF_4$ under with partial pressure of $SiF_4$ shown in Table 3, ten glass preform under each pressure were produced. Δn of the produced glass preform and the presence of bubbles are shown in Table 3.

TABLE 3

| Partial pressure (atm.) | Δn (%) | Number of glass preforms with bubbles |
| --- | --- | --- |
| 0.1 | −0.42 | 3–4 |
| 0.2 | −0.50 | 3–4 |
| 0.3 | −0.55 | 3–4 |
| 0.4 | −0.60 | 3–4 |
| 0.5 | −0.65 | 3–4 |
| 0.6 | −0.66 | 7–8 |
| 0.7 | −0.68 | 7–8 |
| 0.8 | −0.71 | 7–8 |
| 0.9 | −0.73 | Almost all |
| 1.0 | −0.75 | Almost all |

EXAMPLE 8

A soot body used consisted of a core of high N.A. glass added with Ge in an amount corresponding to Δn of 2% around which silica soot particles were deposited.

The soot body was heated in the furnace of FIG. 4 at 1,250° C. under pressure of 0.5 atm. for 1 hour with introducing $SiF_4$ at a rate of 150 ml/min. Then, the body was heated at 1,700° C. under pressure of 0.2 atm. in a helium atmosphere to vitrify it. Δn of the produced glass preform was −0.63%. The difference of the refractive index between the core and the cladding of the optical fiber produced from the produced glass preform was about 2.6%.

EXAMPLE 9

Around a glass rod consisting of a core portion of pure quartz and a peripheral portion of quartz containing fluorine in an amount corresponding to Δn of −0.5% and having a diameter of 10 mm, pure quartz glass particles were deposited to form a soot-body.

The soot body was heated at 1,200° C. in an atmosphere of nitrogen gas containing 2% by mole of chlorine gas by introducing the body in the furnace of FIG. 4 at a descending rate of 4 mm/min. Then, $SiF_4$ was introduced at a flow rate of 200 ml/min. under pressure of 0.2 atm. to produce a glass preform at 1,650° C. The produced glass preform was then drawn to fabricate an optical fiber. The optical fiber had not any absorption due to impurities and sufficiently low attenuation of light transmission of, for example, 0.4 dB/Km at a wavelength of 1.30 μm.

EXAMPLE 10

Around a glass rod consisting of a core portion of pure quartz glass and a peripheral portion of quartz glass added with fluorine in an amount corresponding to Δn of −0.5% and had a diameter of 10 mm, pure quartz glass soot particles were deposited to form a soot body.

The soot body was heated at 1,200° C. for 30 minutes in an atmosphere of nitrogen gas containing 2% by mole of chlorine gas in the furnace of FIG. 4. Then, $SiF_4$ was introduced at a flow rate of 200 ml/min. under pressure of 0.2 atm. to produce a glass preform at 1,650° C. The produced glass preform was then drawn to fabricate an optical fiber. The optical fiber had not any absorption due to impurities and sufficiently low attenuation of light transmission of, for example, 0.4 dB/Km at a wavelength of 1.30 μm.

What is claimed is:

1. A method for producing a glass preform for use in fabrication of an optical fiber, which comprises steps of:
    forming a glass soot composite body having a core portion consisting of a solid glass and a peripheral portion consisting of a porous glass mass,
    removing trapped gas and water from pores of the soot composite body by heating the soot composite body under a pressure lower than several ten Torr. at a temperature at which the porous glass mass is not vitrified,
    filling the pores in the porous glass mass of the soot composite body by introducing a gas containing $SiF_4$ at a pressure of $10^{-2}$ Torr. at the beginning increasing to 1 atmosphere at the end, uniformly adding fluorine to the soot glass mass, and
    vitrifying the fluorine-added soot glass mass into a transparent glass mass to form a glass preform.

2. The method according to claim 1, wherein the porous glass mass of the composite body has a bulk density not less than 0.4 g/cm$^3$.

3. The method according to claim 1, wherein the filling of $SiF_4$ in the pores of the porous glass mass of the composite soot body and the vitrification of the porous glass mass are simultaneously carried out.

* * * * *